United States Patent
Kondo et al.

(10) Patent No.: US 8,898,312 B2
(45) Date of Patent: Nov. 25, 2014

(54) ELEMENT TERMINAL AND COMMUNICATION SYSTEM

(75) Inventors: Miho Kondo, Yokohama (JP); Masaki Nakano, Machida (JP); Tadashi Matsuoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 13/295,922

(22) Filed: Nov. 14, 2011

(65) Prior Publication Data

US 2012/0124221 A1 May 17, 2012

(30) Foreign Application Priority Data

Nov. 15, 2010 (JP) ................................. 2010-254913

(51) Int. Cl.
- *G06F 15/16* (2006.01)
- *H04L 12/26* (2006.01)
- *H04L 12/24* (2006.01)
- *H04L 29/08* (2006.01)

(52) U.S. Cl.
CPC .......... *H04L 43/0811* (2013.01); *H04L 41/069* (2013.01); *H04L 67/14* (2013.01); *H04L 41/0213* (2013.01)
USPC ............. 709/227; 340/2.8; 340/2.9; 370/431; 709/249

(58) Field of Classification Search
CPC ... H04L 67/14; H04L 41/0213; H04L 41/069; H04L 29/06; H04L 29/08576; H04L 29/08072; H04L 29/06993; H04L 69/28
USPC ....................................................... 709/227
See application file for complete search history.

(56) References Cited

U.S. PATENT DOCUMENTS

| 5,491,815 | A | * | 2/1996 | Basso et al. ................. 713/502 |
| 6,115,393 | A | * | 9/2000 | Engel et al. ................. 370/469 |
| 6,161,169 | A | * | 12/2000 | Cheng ........................ 711/150 |
| 2003/0002075 | A1 | * | 1/2003 | Osanai et al. ................ 358/1.15 |
| 2004/0133553 | A1 | * | 7/2004 | Suto .............................. 707/1 |
| 2009/0171704 | A1 | * | 7/2009 | Bobak et al. ..................... 705/7 |

FOREIGN PATENT DOCUMENTS

JP          2009-134395          6/2009

OTHER PUBLICATIONS

"TR-069: CPE WAN Management Protocol v1.1", Version 1 Amendment 2, 2007 The Broadband Forum, Dec. 2007 (hereinafter TR-069).*

"TR-069: CPE WAN Management Protcol v1.1," 2007 The Broadband Forum, Dec. 2007.

* cited by examiner

*Primary Examiner* — Jude Jean Gilles
*Assistant Examiner* — Jaren M Means
(74) *Attorney, Agent, or Firm* — McDermott Will & Emery LLP

(57) ABSTRACT

A terminal allows immediate receipt of notification, while holding down the load on a management control device. The terminal has a timer value storage for storing a timer value, a counter for counting the cycle indicated by the timer value, a connection request part for transmitting a connection request to the management control device every time when the counting is finished, an event detector for detecting an event, and a timer value modifier for modifying the timer value to a value indicating a shorter cycle, upon occurrence of the event. The connection request part further transmits the connection request to the management control device, upon occurrence of detecting the event, and the timer value modifier modifies the timer value a value indicating a longer cycle, upon receiving a message indicating that there is no processing request from the management control device.

7 Claims, 14 Drawing Sheets

EXAMPLE OF EVENT

| EVENT ID | DESCRIPTIONS |
|---|---|
| E001 | REGULAR ACCESS |
| E002 | INCREASE OF CPU UTILIZATION FACTOR |
| E003 | DECREASE OF AVAILABLE MEMORY CAPACITY |
| E004 | ENCLOSURE OPENED |
| ⋮ | ⋮ |

CONNECTION REQUEST 30

RESPONSE MESSAGE 31

| DESTINATION ADDRESS | SOURCE ADDRESS | COMMAND ID | ... |

310 / 311 / 312

EXAMPLE OF COMMAND

| COMMAND ID | DESCRIPTIONS |
|---|---|
| C001 | RESET DEVICE |
| C002 | SET PARAMETER |
| C003 | READ PARAMETER |
| C004 | TRANSMISSION END OF PROCESSING REQUEST |
| C005 | NO PROCESSING REQUEST |
| ⋮ | ⋮ |

FIRST CONSTANT STORAGE 28

| SIGNIFICANCE | FIRST CONSTANT | EVENT ID |
|---|---|---|
| HIGH | A | E001, E002, ··· |
| MODERATE | B | E101, E102, ··· |
| LOW | C | E201, E202, ··· |

SECOND CONSTANT STORAGE 29

| SIGNIFICANCE | SECOND CONSTANT | EVENT ID |
|---|---|---|
| HIGH | A | E001, E002,··· |
| MODERATE | B | E101, E102,··· |
| LOW | C | E201, E202,··· |

ELEMENT TERMINAL AND COMMUNICATION SYSTEM

CROSS REFERENCE TO RELATED APPLICATIONS

This application claims priority to Japanese Patent Application No. 2010-254913 filed on Nov. 15, 2010, the entire contents of which are incorporated by reference herein.

BACKGROUND OF THE INVENTION

1. Field of the Invention

The present invention relates to a technique for managing and controlling equipment, via a communication network.

2. Description of the Related Art

TR-069 (Technical Report 069) is known as s technical specification for implementing communication between communication equipment connected to an external communication network (external equipment), and communication equipment connected to an internal communication network (internal equipment) under the control of an access control device provided with a function of NAT (Network Address Translation) (see, for instance, TR069 CPE WAN Management Protocol v1.1, hereinafter, referred to as "Non patent document").

In this technical specification, the external equipment accumulates information of which the internal equipment is to be notified, and the internal equipment, each under the control of NAT, accesses the external equipment at a constant interval, whereby the external equipment transmits the information being accumulated so far, to the internal equipment at the timing when the internal equipment accesses the external equipment. Furthermore, in this technical specification, when an event occurs in the internal equipment, the internal equipment accesses the external equipment, thereby allowing the external equipment to immediately figure out the state of the internal equipment. If any information that the internal equipment is to be notified is accumulated in the external equipment at the timing of the event occurrence, the information thus accumulated is also allowed to be transmitted to the internal equipment.

SUMMARY OF THE INVENTION

When external equipment (a management control device) manages and controls a few hundred-thousands of internal terminals (element terminals) via a communication network, an accessing cycle from each of the element terminals is elongated in some cases, so as to hold down a load growth on the managing control device. On this occasion, for example, if it is assumed that each of one million element terminals sequentially accesses the management control device every one second, the accessing cycle of each element terminal is at least 10 days.

However, if the accessing cycle is too long, even though there is any information to be reported from the management control device immediately to a specific element terminal, the management control device is not allowed to inform the element terminal of the information until the element terminal re-accesses the management control machine subsequently. Therefore, this may cause a slowdown of an operation which requires urgent action, such as a need of restoration from trouble developed in the element terminal.

In some cases, generation of an event in the element terminal may trigger an access from the element terminal to the management control device, prior to the next accessing cycle, but such event itself does not occur so frequently. Therefore, there is a low probability that an event occurs within the element terminal at a good time for the case where there is information that requires to be reported urgently from the management control terminal to the element terminal.

Furthermore, when an event occurs in the element terminal, some types of such event may require an immediate instruction from the management control device to the element terminal, as to a countermeasure for the event. Therefore, in this situation, it is particularly inconvenient if it is not possible to transmit information immediately from the management control device to the element terminal.

The present invention has been made considering the situation above, and an object of the present invention is to allow the management control device to transmit information which requires to be reported to the element terminal immediately, while holding down the load growth on the management control device.

In order to solve the problems above, a configuration as defined in the appended claims is employed, by way of example. The present application has more than one means for solving the problems above, and one example is directed to; an element terminal connected to a communication network, including a timer value storage for storing a timer value used for counting a cycle for transmitting a connection request to a management control device for managing the element terminal, via the communication network, a counter for reading the timer value in the timer value storage and counting the cycle indicated by the timer value, a connection request transmission part for transmitting the connection request to the management control device via the communication network, every time when the counter finishes counting the cycle indicated by the timer value, an event detector for detecting an event having occurred in the element terminal, and a timer value modifier for modifying the timer value in the timer value storage, to a value indicating a shorter cycle within a range limited to a minimum value being predetermined, upon detecting the event by the event detector, wherein, the connection request transmission part further transmits the connection request to the management control device via the communication network, upon detecting the event by the event detector, and the timer value modifier modifies the timer value in the timer value storage to a value indicating a longer cycle within a range limited to a maximum value being predetermined, upon receiving a message indicating there is no processing request from the management control device, via the communication network.

According to the element terminal of the present application, it is possible to transmit information more promptly to the element terminal, the information required to be notified, while holding down the load growth on the management control device. Any other subject, configuration, and effect except those discussed above will be apparent from the followings which describe preferred embodiments of the application.

DESCRIPTION OF THE PREFERRED EMBODIMENTS

Firstly, the first embodiment of the present invention will be explained, with reference to the accompanying drawings.

Figure 1:
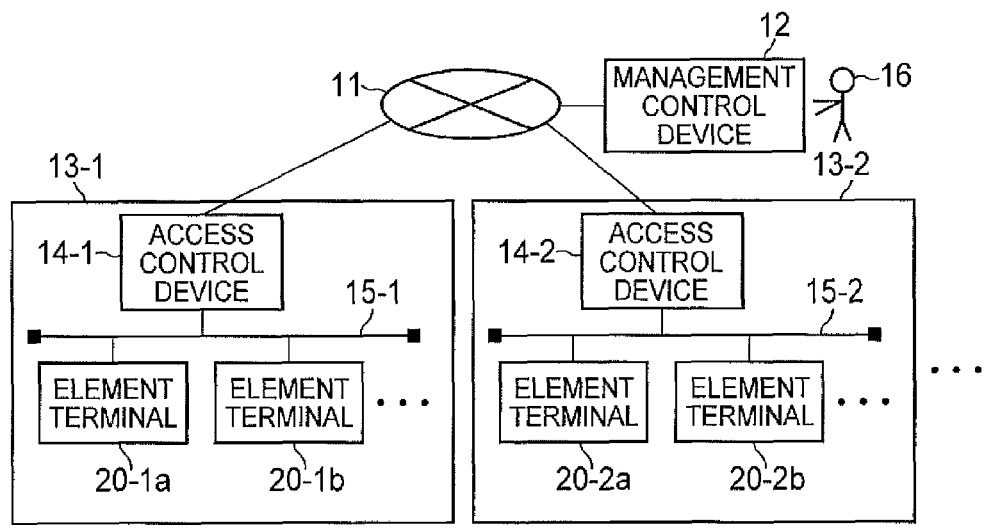
FIG. 1 is a system block diagram showing a configuration of a communication system relating to one embodiment of the present invention.

FIG. 1 is a system configuration diagram showing a configuration of the communication system 10 relating to the first embodiment of the present invention. The communication system 10 includes a management control device 12, multiple access control devices 14, and multiple element terminals 20.

The management control device 12 and each of the access control devices 14 are connected to a communication line 11, such as the Internet. The access control devices 14 are respectively provided in facilities 13, and each of the access control devices 14 is connected to the multiple element terminals 20 via the communication line 15 within each of the facilities 13. Each of the element terminals 20 may be a modem, a home gateway, or the like.

Each of the access control devices 14 controls to permit communication between the communication equipment connected to the communication line 15 (in FIG. 1, the element terminals 20, for instance), and the communication equipment connected to the communication line 11 (in FIG. 1, the management control device 12), the communication being started from the communication equipment connected to the communication line 15. On the other hand, each of the access control devices 14 controls to prohibit communication between the communication equipment connected to the communication line 15 and the communication equipment connected to the communication line 11, the communication being started from the communication equipment connected to the communication line 11.

The access control device 14 may be an NAT (Network Address Translation) router, for instance, in the present embodiment. As an alternative example, the access control device 14 may be a firewall, or the like, which does not execute address translation.

The management control device 12 is manipulated by an operator 16. The management control device 12 accepts information of which each element terminal 20 is to be notified, a request of processing, and the like from the operator 16, and accumulates those information items in a memory within the management control device 12. Then, upon establishing communication with the element terminal 20, the management control device 12 transmits the information items accumulated in the memory to the element terminal 20.

Since the management control device 12 communicates with each of the element terminals 20 via the access control device 14, if the communication is not started from each of the element terminals 20, the management control device 12 can not start the communication with the element terminal 20 via the access control device 14. Accordingly, each of the element terminals 20 accesses the management control device 12 and establishes a communication path therewith, at a predetermined time interval or at the timing when an event occurs in the element terminal 20, and receives provision of necessary information from the management control device 12.

Figure 2:
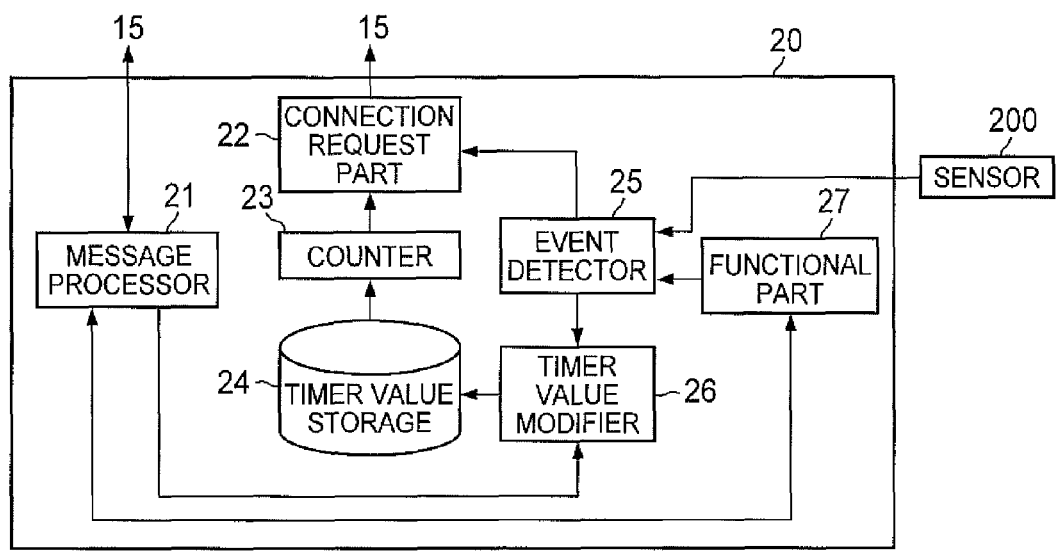
FIG. 2 is a block diagram showing one configuration example of an element terminal according to the first embodiment.

FIG. 2 is a block diagram showing a configuration example of the element terminal 20 according to the first embodiment. The element terminal 20 has a message processor 21, a connection request part 22, a counter 23, a timer value storage 24, an event detector 25, a timer value modifier 26, and a functional part 27.

The functional part 27 is a functional block for executing the processing unique to the element terminal 20. In the case where the element terminal 20 is a home gateway, for instance, the functional part 27 performs processing such as networking and controlling various terminals such as a personal computer, and transferring information received from communication or broadcasting media to various terminals. Upon receipt of a directive from the message processor 21, such as resetting, setting or reading a parameter, the functional part 27 performs processing according to the directive, and notifies the message processor 21 of a result of the processing.

The event detector 25 monitors a signal from the sensor 200 for detecting information such as whether or not a cover of the enclosure of the element terminal 20 is open, and information of the functional part 27, such as a CPU utilization factor and available memory capacity. Then, the event detector 25 notifies the connection request part 22 of an even ID which identifies an event, and further notifies the timer value modifier 26 that the event has occurred, in the following cases such as; the event detector receives from the sensor 200, a signal indicating that the cover of the enclosure of the element terminal 20 is open, the CPU utilization factor of the element terminal 20 exceeds a predetermined threshold, the available memory capacity of the element terminal 20 falls below a predetermined threshold.

Figures 3, 4:
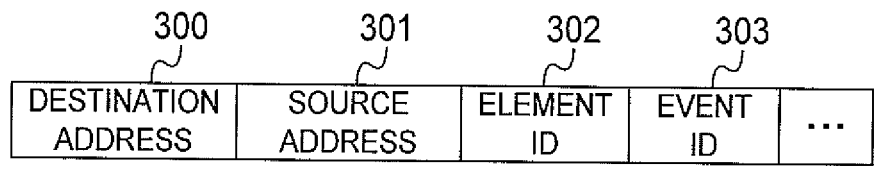
FIG. 3 illustrates an example of an event.
FIG. 4 illustrates an example of a data structure of a connection request.

FIG. 3 illustrates a relationship between the event and the event ID, by way of example. As shown in FIG. 3, the event ID in the present embodiment includes, for example, "E001" indicating a regular access along with the end of counting the timer value, "E002" indicating that the CPU utilization factor of the element terminal 20 exceeds a predetermined threshold, "E003" indicating the available memory capacity of the element terminal 20 falls below a predetermined threshold, "E004" indicating that the cover of the enclosure of the element terminal 20 is open, and the like.

The timer value storage 24 stores a timer value for counting a cycle of transmitting a connection request to the management control device 12, via the access control device 14. The timer value modifier 26 holds a maximum value and a minimum value of the timer value in advance, and upon receipt of a notice from the event detector 25 indicating that an event has occurred, or upon receipt of an instruction from the message processor 21 to change the timer value to the minimum value, the timer value modifier 26 modifies the timer value within the timer value storage 24 to the minimum value, unless the timer value therein is already the minimum value.

Upon receipt of an instruction from the message processor 21 indicating to restore the timer value to the maximum value, the timer value modifier 26 restores the timer value in the timer value storage 24 to the maximum value, unless the timer value therein is already the maximum value. Here, the minimum value of the timer value represents a value for allowing the counter 23 to count the time approximately for 10 minutes, for instance, and the maximum value of the timer value represents a value for allowing the counter 23 to count the time approximately for one day, for instance.

The counter 23 reads the timer value in the timer value storage 24, and counts the cycle indicated by the timer value. When counting is finished, the counter 23 notifies the connection request part 22 that the counting of the timer value is finished, again reads the timer value in the timer value storage 24 and resumes counting the cycle indicated by the timer value. In addition, when the timer value in the timer value storage 24 is updated, the counter 23 reads the timer value in the timer value storage 24 and starts counting the cycle indicated by the timer value.

The connection request part 22 generates a connection request upon receipt of a notice from the counter 23 that counting of the timer value is finished, or upon receipt of a notice regarding the event ID from the event detector 25, and transmits the connection request thus generated to the management control device 12 via the access control device 14.

By way of example, as shown in FIG. 4, the connection request has a destination address 300 being an address of the management control device 12, a source address 301 being an address of the element terminal 20, an element ID 302 for identifying the element terminal 20 being the transmission source, and an event ID 303 for identifying the event serving as a trigger of the connection request. It is to be noted that in the present embodiment, the access control device 14 rewrites the source address 301 to a predetermined address.

Figures 5, 6:
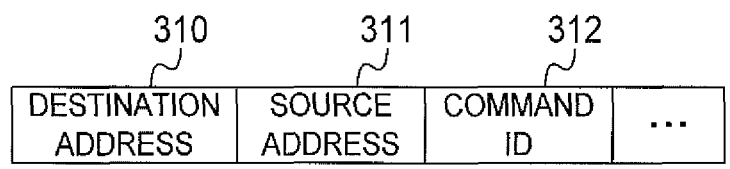
FIG. 5 illustrates an example of a data structure of a response message.
FIG. 6 illustrates an example of a command.

The message processor 21 receives a response message transmitted from the management control device 12 via the access control device 14, in response to the connection request transmitted by the connection request part 22. By way of example, as shown in FIG. 5, the response message has a destination address 310 being the address predetermined by the access control device 14 associated with the element terminal 20, a source address 311 being the address of the management control device 12, and a command ID 312 for specifying a command from the management control device 12. It is to be noted that the response message 31 is transferred to the element terminal 20, after the access control device 14 rewrites the destination address 301 from the predetermined address to the address of the element terminal 20.

FIG. 6 illustrates a relationship between a description of the directive from the management control device 12 and the command ID, by way of example. The command ID includes "C001" indicating a directive for resetting the element terminal 20, "C002" indicating a directive for setting a parameter, "C003" indicating a directive for reading the parameter, "C004" indicating a transmission end of a processing request, and "C005" indicating that there is no processing request, and the like.

In the case where "C002" indicating a directive to set a parameter is stored as the command ID 312, further information indicating such as a position where the parameter is to be set, is appropriately appended to each parameter value which is a setting target, within the response message 31.

Upon receipt of the response message transmitted from the management control device 12 via the access control device 14, the message processor 21 extracts the command ID stored in the response message. Then, when the command ID corresponds to a request of the processing, such as resetting (C001), parameter setting (C002), parameter reading (C003), or the like, the message processor 21 provides a directive command to the functional part 27 to perform the processing thus requested.

Upon receipt of a result of processing directed in the command from the functional part 27, the message processor 21 generates a message including the result of the processing and further including the event ID indicating an individual response, and transmits the message thus generated to the management control device 12 via the access control device 14.

When the command ID stored in the response message transmitted from the management control device 12 is "C004" indicating the transmission end of the processing request, the message processor 21 provides a directive command to the timer value modifier 26 to modify the timer value to the minimum value.

When the command ID stored in the response message transmitted from the management control device 12 is "C005" indicating that there is no processing request, the message processor 21 provides a directive command to the timer value modifier 26 to modify the timer value to the maximum value.

Figure 7:
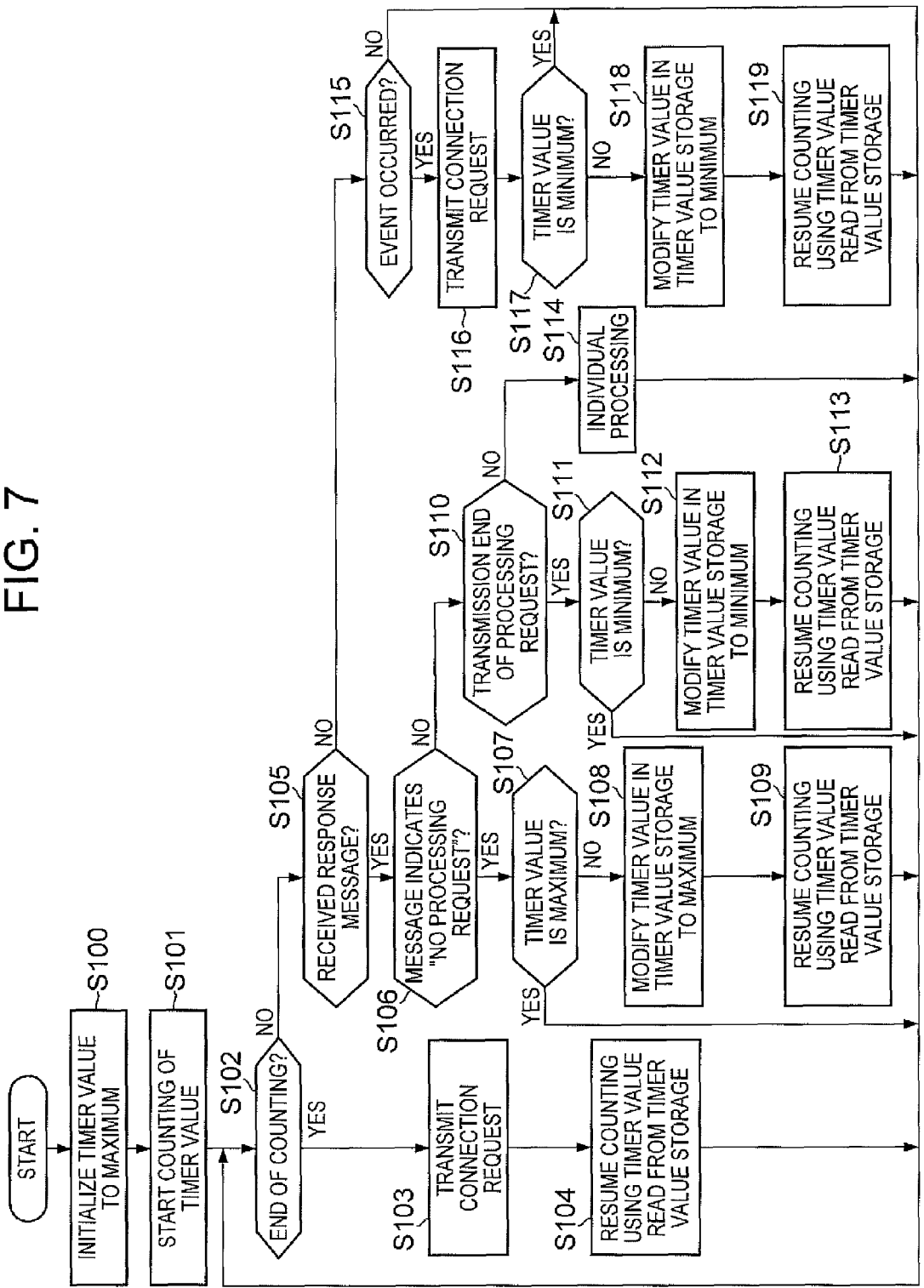
FIG. 7 is a flowchart showing an operation example of the element terminal according to the first embodiment.

FIG. 7 is a flowchart showing an operation example of the element terminal 20 according to the first embodiment. By way of example, the element terminal 20 starts the operation shown in the flowchart at the timing such as turning on power, after predetermined settings are made.

Firstly, the timer value modifier 26 initializes the timer value within the timer value storage 24 to a maximum value (S100). Since the timer value in the timer value storage 24 is updated, the counter 23 reads the timer value in the timer value storage 24 and starts counting of the cycle indicated by the timer value (S101).

Next, the counter 23 determines whether or not counting of the timer value is finished (S102). When the counting of the timer value ends (S102: Yes), the counter 23 notifies the connection request part 22 that the counting is finished. The connection request part 22 generates a connection request which has been explained with reference to FIG. 4. On this occasion, in the field of the event ID of the connection request, there is stored "E001" indicating a regular access along with the end of counting the timer value.

Next, the connection request part 22 transmits the connection request thus generated to the management control device 12 via the access control device 14 (S103). Then, the counter 23 reads the timer value in the timer value storage 24 again, resumes counting the cycle indicated by the timer value being read (S104), and executes the processing as shown in the step S102 again.

In the step S102, if counting of the timer value is not finished (S102: No), the message processor 21 determines whether or not a response message is received from the management control device 12 (S105). When the response message is received (S105: Yes), the message processor 21 extracts the command ID in the response message being received, and determines whether or not the command ID being extracted indicates that "there is no processing request" (S106).

If the command ID in the response message indicates that "there is no processing request" (S106: Yes), the message processor 21 issues a directive to the timer value modifier 26, to change the timer value to the maximum value. The timer value modifier 26 reads the timer value within the timer value storage 24, and determines whether or not the timer value in the timer value storage 24 is already the maximum value (S107). If the timer value in the timer value storage 24 is the maximum value (S107: Yes), the counter 23 executes the processing as shown in the step S102 again.

On the other hand, if the timer value in the timer value storage 24 is not the maximum value (S107: No), the timer value modifier 26 modifies the timer value in the timer value storage 24 to the maximum value (S108). Since the timer value in the timer value storage 24 is updated, the counter 23 reads the timer value in the timer value storage 24, resumes counting the cycle indicated by the timer value being read (S109), and executes again the processing as shown in the step S102.

In the step S106, if the command ID in the response message does not indicate that "there is no processing request" (S106: No), the message processor 21 determines whether or not the command ID in the response message indicates the "transmission end of the processing request" (S110).

When the command ID in the response message indicates the "transmission end of the processing request" (S110: Yes), the message processor 21 provides a directive command to the timer value modifier 26 to modify the timer value to a minimum value. The timer value modifier 26 reads the timer value in the timer value storage 24, and determines whether or not the timer value in the timer value storage 24 is the minimum value (S111). If the timer value in the timer value storage 24 is already the minimum value (S111: Yes), the counter 23 executes the processing as shown in the step S102 again.

On the other hand, if the timer value in the timer value storage 24 is not the minimum value (S111: No), the timer value modifier 26 modifies the timer value in the timer value storage 24 to the minimum value (S112). Since the timer value in the timer value storage 24 is updated, the counter 23 reads the timer value in the timer value storage 24, resumes counting of the cycle indicated by the timer value being read (S113), and executes the processing as shown in the step S102 again.

In the step S110, if the command ID in the response message does not indicate the "transmission end of the processing request" (S110: No), it means that the command ID in the response message indicates a request for performing the processing. Therefore, the message processor 21 executes individual processing (S114) and the counter 23 again executes the processing as shown in the step S102.

It is to be noted that in the individual processing in the step 114, the message processor 21 provides a directive command to the functional part 27 to perform the processing associated with the command ID in the response message, and the functional part 27 executes the processing in response to the command. Then, the functional part 27 transmits a result of the processing to the message processor 21, and the message processor 21 generates a message including the information indicating the result of the processing, and transmits the message to the management control device 12.

In the step S105, in the case where the response message is not received (S105: No), the event detector 25 determines whether or not any event has occurred (S115). If the event has not occurred (S115: No), the counter 23 executes again the processing as shown in the step S102.

In the case where an event occurs (S115: Yes), the event detector 25 notifies the connection request part 22 of the event ID, and also notifies the timer value modifier 26 that the event has occurred. The connection request part 22 generates a connection request as explained with reference to FIG. 4. On this occasion, in the field of the event ID of the connection request, there is stored an ID associated with a description of the event that has occurred. The connection request part 22 transmits the connection request being generated to the management control device 12 via the access control device 14 (S116).

Next, the timer value modifier 26 reads the timer value in the timer value storage 24, and determines whether or not the timer value in the timer value storage 24 is already the minimum value (S117). If the timer value in the timer value storage 24 is already the minimum value (S117: Yes), the counter 23 executes again the processing as shown in the step S102.

On the other hand, if the timer value in the timer value storage 24 is not the minimum value (S117: No), the timer value modifier 26 modifies the timer value in the timer value storage 24 to the minimum value (S118). Since the timer value in the timer value storage 24 is updated, the counter 23 reads the timer value in the timer value storage 24. Then, the counter 23 resumes counting of the cycle indicated by the timer value being read (S119), and executes again the processing as shown in the step S102.

Figure 8:
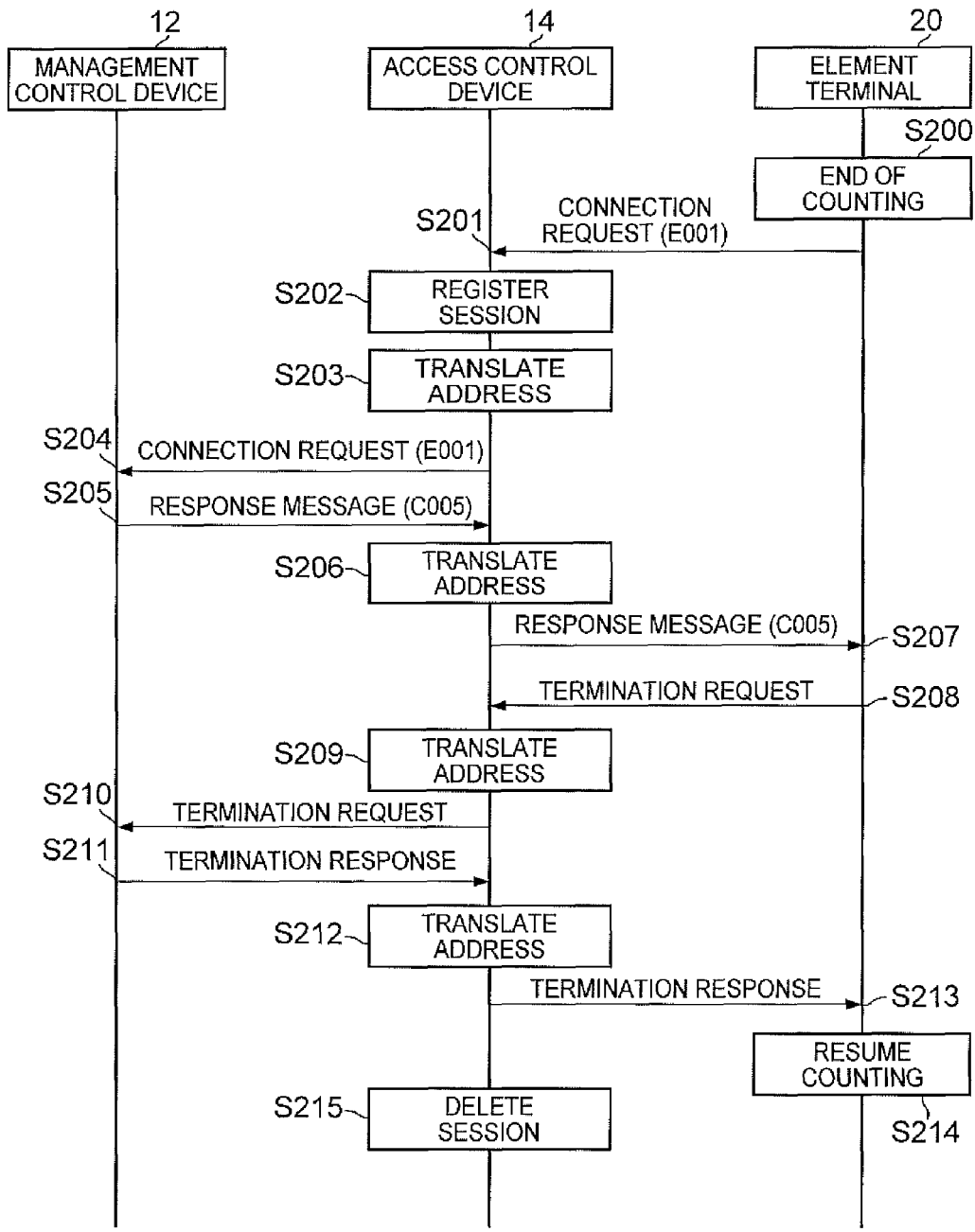
FIG. 8 is a sequence diagram for explaining a cyclical access from the element terminal.

Next, with reference to FIG. 8, an operation of the communication system 10 will be explained, in the case where the element terminal 20 periodically accesses the management control device 12, and no processing request is transmitted from the management control device 12. It is to be noted that if there is any processing request to be notified to the element terminal 20, the management control device 12 holds the processing request in association with the element ID of the element terminal 20, in the memory within the management control device 12. In addition, it is assumed that at the time of starting the sequence as shown in FIG. 8, the timer value is the maximum value.

Firstly, the element terminal 20 detects that counting of the timer value is finished (S200), generates a connection request having "E001" indicating a regular access along with the end of counting the timer value, and transmits the connection request thus generated to the access control device 14 via the communication line 15 (S201).

The access control device 14 registers in the memory within the access control device 14, as session information, a combination of a destination address and a source address included in the connection request received from the element terminal 20 (S202). Then, the access control device 14 rewrites the source address included in the connection request received from the element terminal 20 to a predetermined address (S203), and transmits the connection request, in which the source address has been rewritten, to the management control device 12 being a destination of the connection request, via the communication line 11 (S204).

The management control device 12 detects that any processing request associated with the element ID included in the connection request being received is not registered in the memory, generates a response message (see FIG. 5) having "C005" indicating that there is no processing request, and transmits the response message thus generated to the access control device 14 via the communication line 11 (S205).

The access control device 14 specifies in the memory therein, the session information in which an address identical to the source address of the response message received from the management control device is registered as the destination address. Then, the access control device 14 translates the destination address of the response message received from the management control device 12 to the address registered as the source address in the specified session information (i.e., the address of the element terminal 20 in FIG. 8) (S206), and transmits the response message, in which the destination address has been updated to the element terminal 20, via the communication line 15 (S207).

Since the command ID indicating that there is no processing request is included in the response message being received, the element terminal 20 transmits a termination request to the management control device 12 via the access control device 14 (S208 to S210). The management control device 12 returns a termination response to the termination request being received (S211 to S213). Upon receipt of the termination response, the element terminal 20 restores the timer value to the maximum value, if it is not the maximum value, and resumes counting of the timer value which is currently the maximum value (S214).

While relaying the termination response, the access control device 14 deletes from the memory, the session information used for relaying the termination response (S215). It is to be noted that the access control device 14 also executes the processing for deleting from the memory, the session information as to which a period equal to or longer than a predetermined time (e.g., three minutes) has elapsed from the last relaying.

Figure 9:
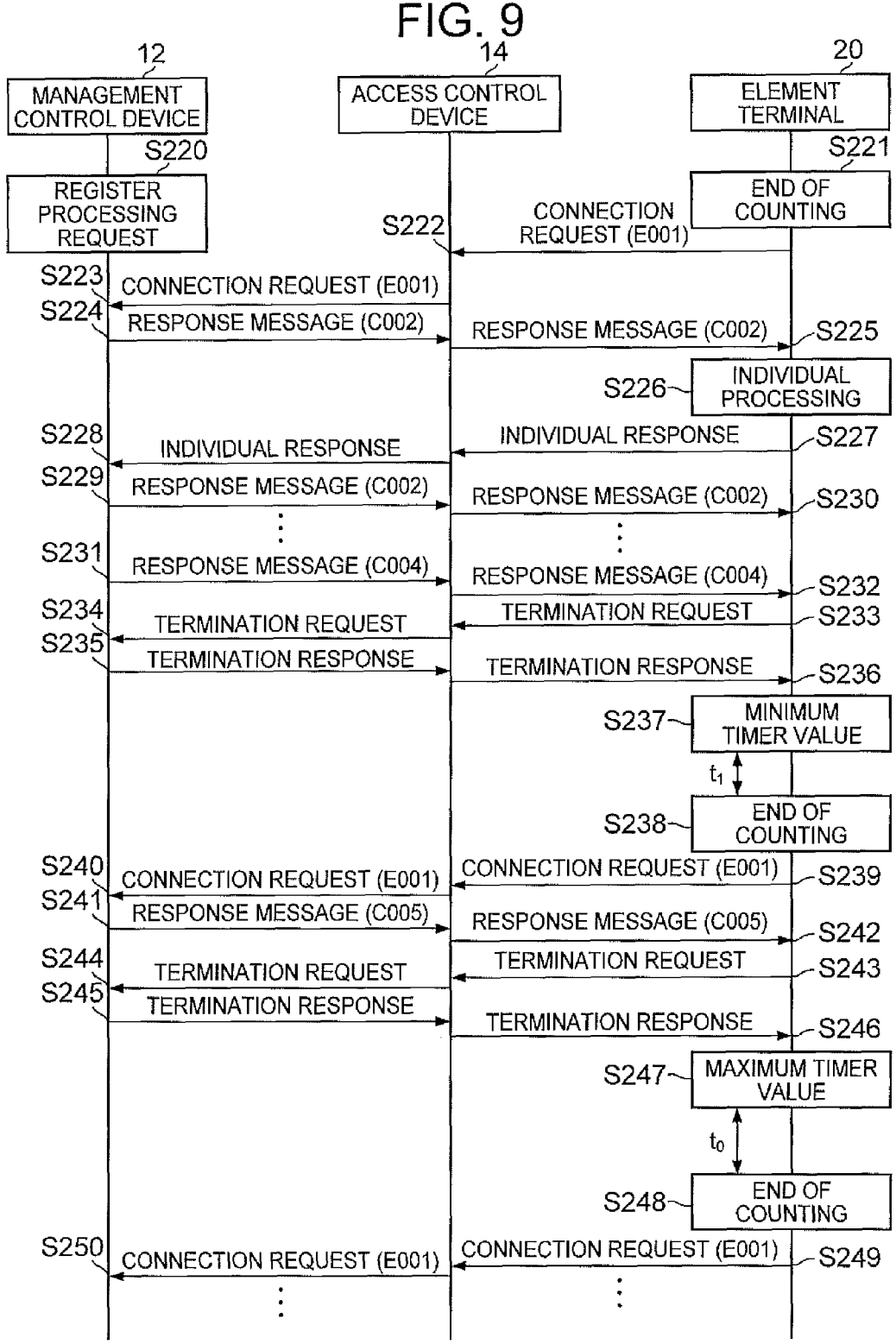
FIG. 9 is a sequence diagram for explaining an accessing interval change of the element terminal, in the case where a processing request is transmitted from a management control device according to the first embodiment.

Next, with reference to the sequence diagram as shown in FIG. 9, an operation of the communication system 10 will be explained, in the case where the element terminal 20 periodically accesses the management control device 12 and a processing request is transmitted from the management control device 12. It is assumed that the timer value is a maximum value at the time of starting of the sequence as shown in FIG. 9. In addition, in FIG. 9, in order to avoid a complicated explanation, the session management and address translation in the access control device 14, which are the same as those in FIG. 8, will not be tediously explained.

Firstly, an operator 16 registers in the management control device 12, a processing request directed to the element terminal 20 (S220). The element terminal 20 detects that counting of the timer value is finished (S221), generates a connection request having "E001" indicating a regular access along with the end of counting the timer value, and transmits the connection request thus generated to the management control device 12 via the access control device 14 (S222, S223).

The management control device 12 detects that a processing request associated with the element ID included in the connection request being received is registered in the memory, generates a response message having the command ID (e.g., "C002") indicating the processing request being registered, and transmits the response message thus generated to the element terminal 20 via the access control device 14 (S224, S225).

The element terminal 20 executes the processing indicated by the command ID in the response message being received (S226) and transmits an individual response indicating a result of the processing to the management control device 12 via the access control device 14 (S227, S228). If any processing request directed to the element terminal 20 still remains in the memory, the management control device 12 subsequently generates a response message having a command ID indicating the processing request being registered, and transmits the response message thus generated to the element terminal 20 via the access control device 14 (S229, S230).

After finishing transmission to the element terminal 20, as to all the processing requests registered in the memory directed to the element terminal 20, the management control device 12 generates a response message having "C004" indicating the transmission end of the processing request, and transmits thus generated response message to the element terminal 20 via the access control device 14 (S231, S232). The element terminal 20 transmits a termination request to the management control device (S233, S234) and receives a termination response from the management control device 12 (S235, S236).

Next, the element terminal 20 sets the timer value to be a minimum value and resumes counting of the timer value (S237). This process corresponds to the process in the following steps; the step S110 (Yes), the step S111 (No), the step S112, and the step S113, which have been explained with reference to FIG. 7.

Then, when counting the time $t_1$ corresponding to the minimum timer value is finished (S238), the element terminal 20 generates a connection request having "E001" indicating a regular access along with the end of counting the timer value, and transmits the connection request thus generated to the management control device 12 via the access control device 14 (S239, S240).

If any processing request directed to the element terminal 20 is not accumulated in the memory, the management control device 12 generates a response message having "C005" indicating that there is no processing request, and transmits thus generated response message to the element terminal 20 via the access control device 14 (S241, S242). The element terminal 20 transmits a termination request to the management control device 12 (S243, S244), and receives a termination response from the management control device 12 (S245, S246).

Next, the element terminal 20 sets the timer value to be a maximum value and resumes counting the timer value (S247). This process corresponds to the process to the following steps; the step S106 (Yes), the step S107 (No), the step S108, and the step S109, which have been explained with reference to FIG. 7.

When counting of the time $t_0$ corresponding to the maximum timer value is finished (S248), the element terminal 20 generates a connection request having "E001" indicating a regular access along with the end of counting the timer value, and transmits thus generated connection request to the management control device 12 via the access control device 14 (S249, S250).

As discussed above, when it is requested from the management control device 12 to perform processing, the element terminal 20 modifies the time period until the next access to the management control device 12 to be a shorter period. Accordingly, after the management control device 12 requests the element terminal 20 to perform processing, it is possible to establish again a communication path with the element terminal 20 within a short period. Therefore, this allows to immediately settle the status change that has occurred in the element terminal 20 due to the processing requested to the element terminal 20, and also allows more immediate implementation of the next processing request. In addition, since the interval until the next access can be modified as to only the element terminal which is required to perform processing, this accelerates processing directed to the necessary elements, while holding down the load growth on the management control device 12.

Figure 10:
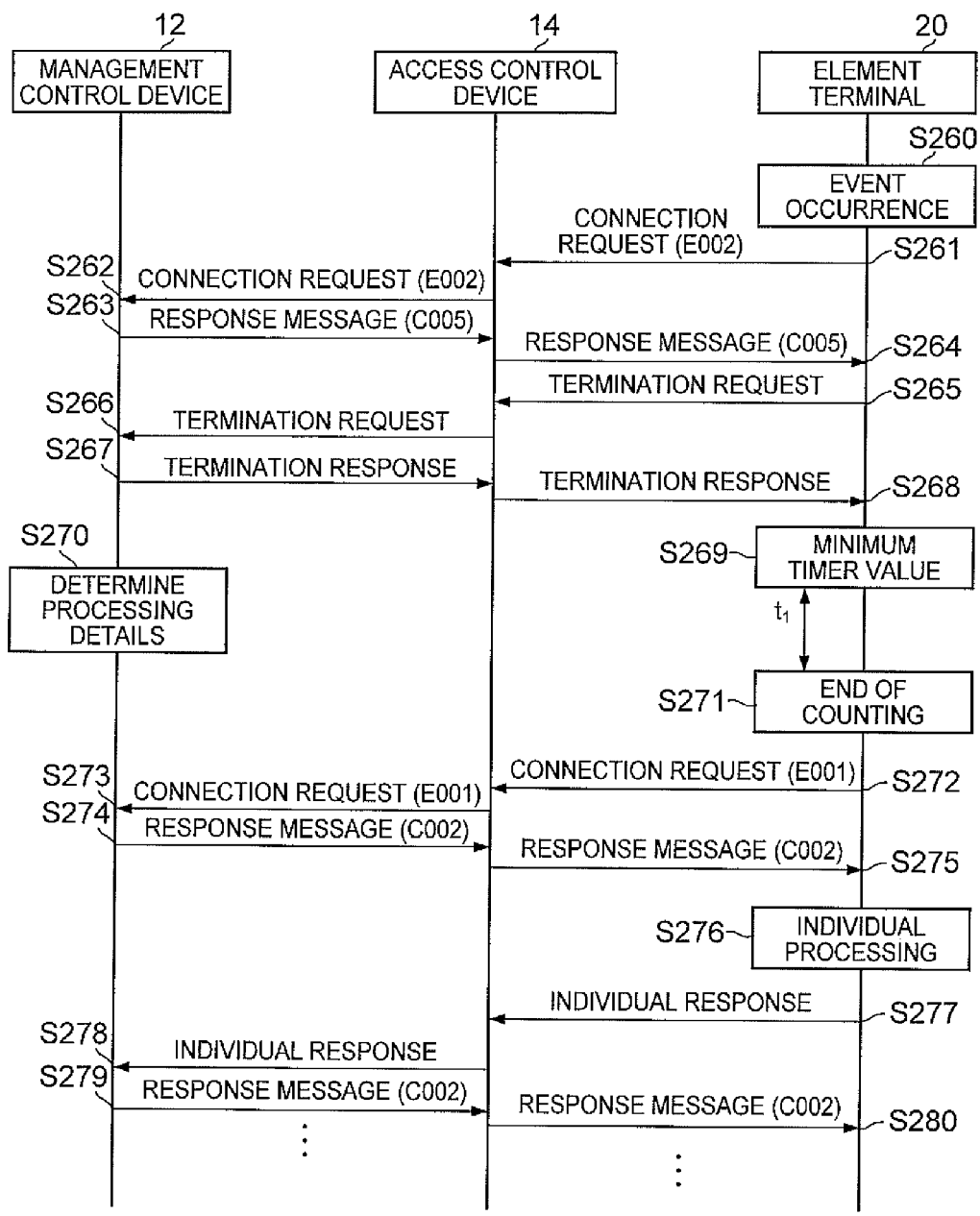
FIG. 10 is a sequence diagram for explaining the accessing interval change of the element terminal, in the case where an event occurs according to the first embodiment.

Next, with reference to the sequence diagram of FIG. 10, an operation of the communication system 10 will be explained, in the case where the element terminal 20 accesses the management control device 12 in response to an event occurrence. In FIG. 10, in order to avoid a complicated explanation, the session management and address translation performed in the access control device 14, which are the same as those in FIG. 8, will not be tediously explained.

The element terminal 20 detects occurrence of an event (S260), generates a connection request having an event ID (e.g., "E002") in association with the event being detected, and transmits thus generated connection request to the management control device 12 via the access control device 14 (S261, S262).

If there is no processing request directed to the element terminal 20 is accumulated in the memory, the management control device 12 generates a response message having "C005" indicating that there is no processing request, and transmits thus generated response message to the element terminal 20 via the access control device 14 (S263, S264). Then, the element terminal 20 transmits a termination request to the management control device 12 (S265, S266), receives a termination response from the management control device 12 (S267, S268), sets the timer value to be a minimum value, and resumes counting the timer value (S269).

In the mean time, in the management control device 12, based on the event ID included in the connection request transmitted from the element terminal 20, the operator 16 determines a process for addressing the event associated with the event ID, and accumulates a processing request being determined, in the memory of the management control device 12 (S270).

When counting of the time $t_1$ corresponding to the minimum timer value is finished (S271), the element terminal 20 generates a connection request having "E001" indicating a regular access along with the end of counting the timer value, and transmits thus generated connection request to the management control device 12 via the access control device 14 (S272, S273). The management control device 12 generates a response message having the command ID (e.g., "C002") indicating the processing request being registered, and transmits thus generated response message to the element terminal 20 via the access control device 14 (S274, S275).

The element terminal 20 executes the processing indicated by the command ID in the response message being received (S276), and transmits an individual response indicating a result of the processing, to the management control device 12 via the access control device 14 (S277, S278).

If any processing request directed to the element terminal 20 still remains in the memory, the management control device 12 subsequently generates a response message having the command ID indicating the processing request being registered, and transmits the response message being generated to the element terminal 20 via the access control device 14 (S279, S280). Since subsequent processes are the same as those from the step S231 having been explained with reference to FIG. 9, tedious explanation will not be made.

As discussed above, the element terminal 20 modifies the time period until the next access to the management control device 12 to be a shorter period of time, when an event occurs. Accordingly, it is possible to establish a communication path again with the element terminal 20 within a short period, and a description of the process which needs to be performed in response to the event occurrence, is allowed to be immediately transferred from the management control device 12 to the element terminal 20.

The first embodiment of the present invention has been explained so far.

As obvious from the discussion above, according to the communication system 10 of the present embodiment, it is possible to transfer information more promptly to each of the element terminals 20, the information necessary to be reported to the element terminals 20, while holding down the load growth on the management control device 12.

Next, an explanation will be made as to a second embodiment of the present invention. In the first embodiment, the timer value is modified to a maximum value, upon receipt of a response message from the management control device 12, the message indicating that there is no processing request in response to the connection request issued after counting of the timer value is finished. The present embodiment is different from the first embodiment in the point that the timer value is made larger gradually.

Figure 11:
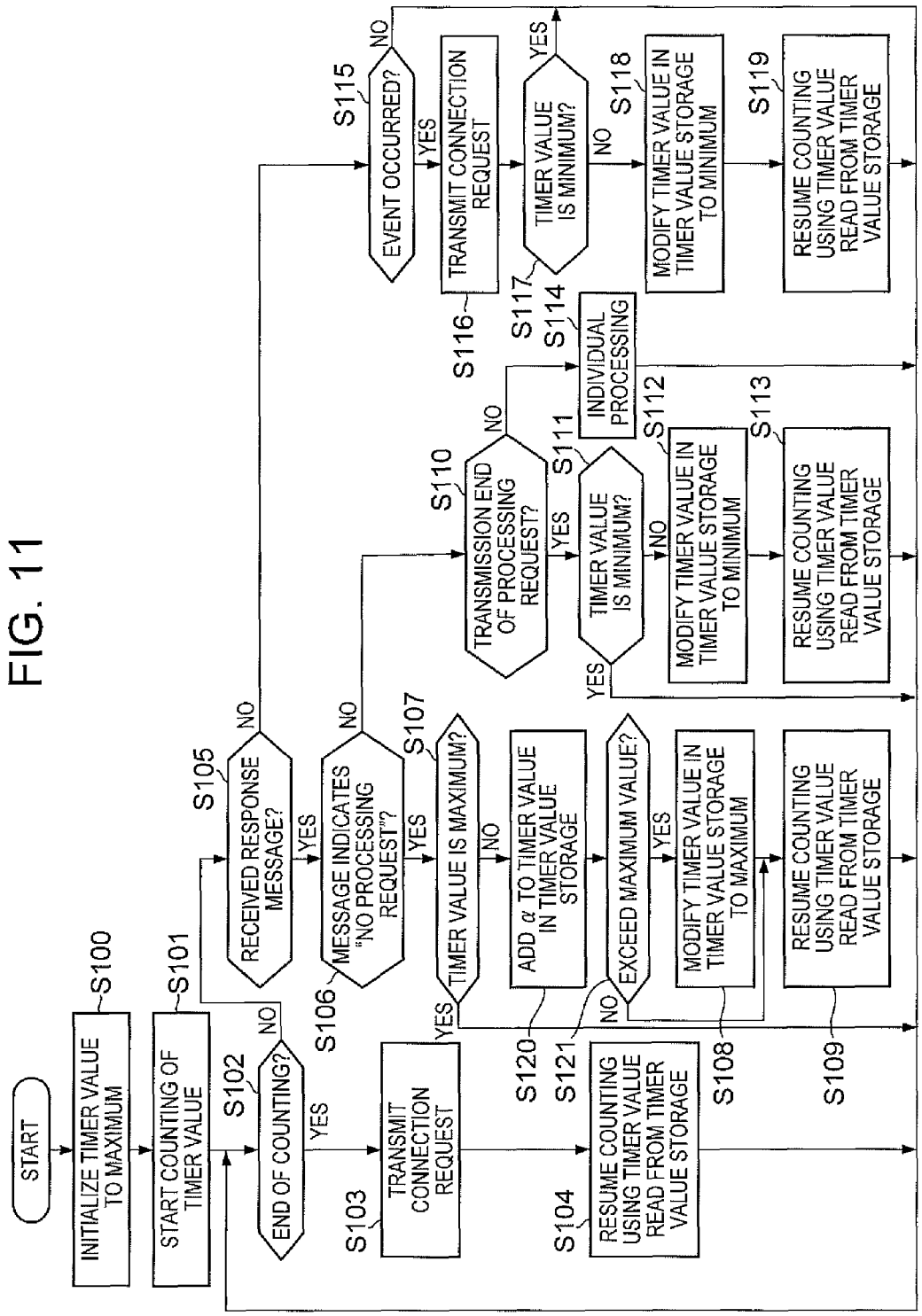
FIG. 11 is a flowchart showing an operation example of the element terminal according to a second embodiment.

FIG. 11 is a flowchart showing an operation example of the element terminal 20 according to the second embodiment. It is to be noted that except the point described above, the processes in FIG. 11 labeled the same as those in FIG. 7 are similarly performed, and therefore they will not be explained tediously.

In the step S107, if the timer value in the timer value storage 24 is not a maximum value (S107: No), the timer value modifier 26 adds a predetermined constant α to the timer value currently in the timer value storage 24 (S120). The constant α may be a value indicating a certain period of time for the counter 23 to count, such as around 30 minutes, for instance.

Next, the timer value modifier 26 determines whether or not the timer value to which the constant α has been added exceeds a predetermined maximum value (S121). When the timer value to which the constant α has been added exceeds a predetermined maximum value (S121: Yes), the timer value modifier 26 executes the process as shown in the step S108. On the other hand, if the timer value to which the constant α has been added does not exceed the maximum value (S121: No), the timer value modifier 26 updates the timer value in the timer value storage 24, to the timer value to which the constant α has been added, and counter 23 executes the process as shown in the step 109.

Figure 12:
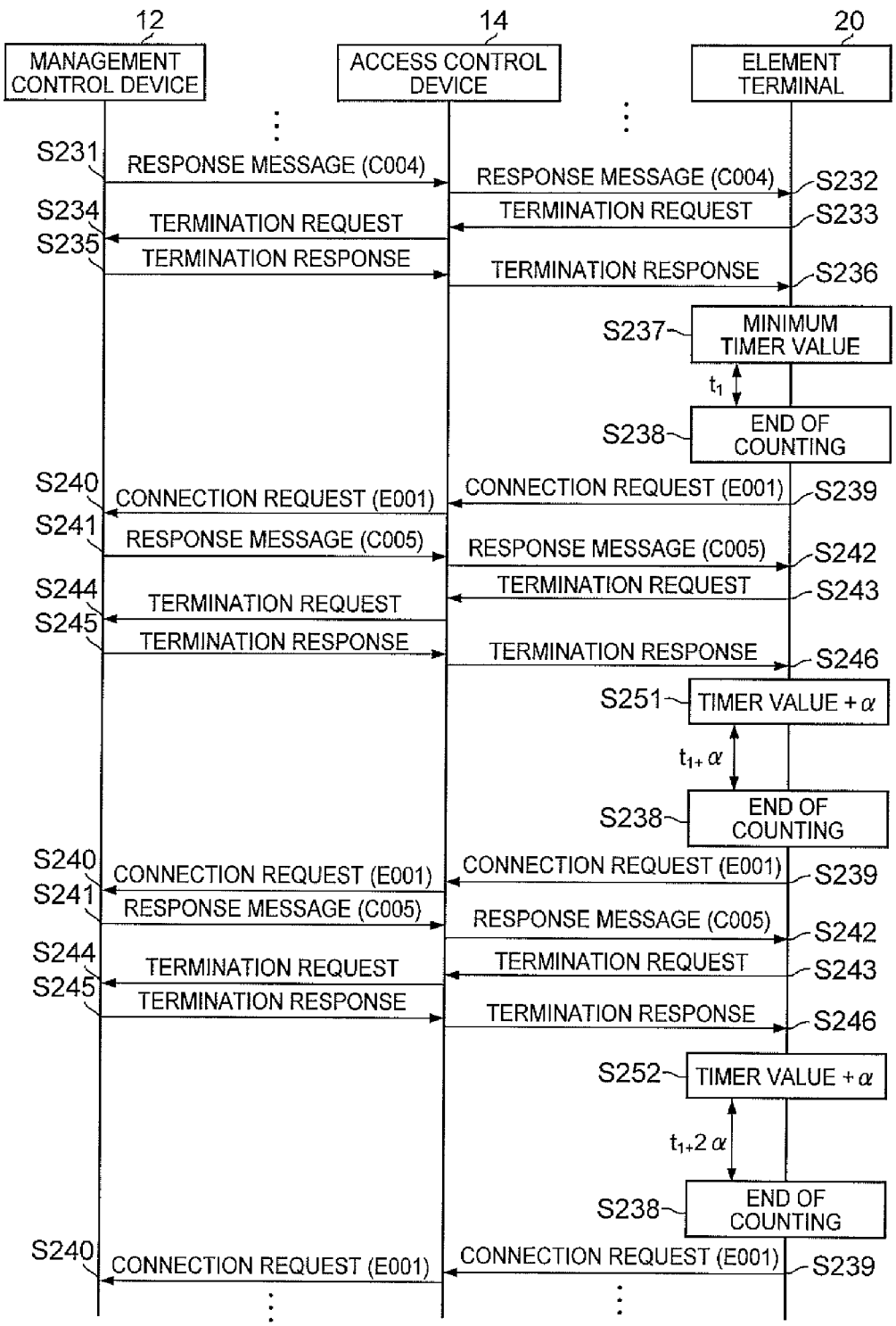
FIG. 12 is a sequence diagram for explaining the accessing interval change of the element terminal, in the case where a processing request is transmitted from the management control device according to the second embodiment.

Next, with reference to the sequence diagram shown in FIG. 12, an operation of the communication system 10 will be explained, in the case where a processing request is transmitted from the management control device 12. It is to be noted that except the points described below, the processes in the sequence diagram of FIG. 12, labeled the same as those in the sequence diagram of FIG. 9 are performed in the same manner as the processing in the sequence diagram of FIG. 9, and therefore they will not be explained tediously.

Firstly, after finishing transmission to the element terminal 20, as to all the processing requests in the memory directed to the element terminal 20, the management control device 12 generates a response message having "C004" indicating the transmission end of the processing request, and transmits thus generated response message to the element terminal 20 via the access control device 14 (S231, S232). The element terminal 20 transmits a termination request to the management control device 12 (S233, S234), and receives a termination response from the management control device 12 (S235, S236).

Next, the element terminal 20 sets the timer value to be a minimum value and resumes counting (S237). Then, when counting the time $t_1$ corresponding to the minimum timer value is finished (S238), the element terminal 20 generates a connection request having "E001" indicating a regular access along with the end of counting the timer value, and transmits thus generated connection request to the management control device 12 via access control device 14 (S239, S240).

If any processing request directed to the element terminal 20 is not accumulated in the memory, the management control device 12 generates a response message having "C005" indicating that there is no processing request, and transmits thus generated response message to the element terminal 20 via the access control device 14 (S241, S242). Then, the element terminal 20 transmits a termination request to the management control device 12 (S243, S244), and receives a termination response from the management control device 12 (S245, S246).

Next, the element terminal 20 adds a predetermined constant $\alpha$ to the timer value at the current point of time, and resumes counting the timer value to which the constant $\alpha$ has been added (S251). This process corresponds to the following steps; the step S106 (Yes), the step S107 (No), the step S120, the step S121 (No), and the step S109 as explained with reference to FIG. 11.

Subsequently, every time when counting of the timer value is finished (S238), the element terminal 20 transmits a connection request (S239, S240), receives a response message indicating that there is no processing request from the management control device 12 (S241, S242), adds the constant $\alpha$ to the timer value at the current point of time within the range limited to the maximum value, and resumes counting the timer value to which the constant $\alpha$ has been added (S252).

As thus described, when a processing request is received from the management control device 12, even though anymore processing request is not transmitted from the management control device 12 subsequently, the timer value is not modified to the maximum value at once, but there is performed a process to allow the timer value to gradually approach the maximum value.

By way of example here, in the case where a failure occurs in the element terminal 20, the operator 16 of the management control device 12 communicates with a user of the element terminal 20, while checking state variation of the element terminal 20, and in some cases, the operator 16 determines what setting changes have to be executed in the element terminal 20. On this occasion, immediately after the element terminal 20 is requested to change the settings or the like, it is probable that the operator 16 further wants to request the element terminal 20 to perform a subsequent process via the management control device 12.

However, if the element terminal 20 repeats accessing the management control device 12 within a short period of time, processing loads on the management control device 12 may be increased. Considering this situation, in the present embodiment, immediately after a process is requested to the element terminal 20 to change the settings, or the like, the element terminal 20 is allowed to access again the management control device 12 within a short period of time. Then, along with a lapse of time from when the process was requested, an interval of the access to the management control device 12 is gradually restored to the maximum value. With this configuration, it is possible to establish both a prompt processing request to the element terminal 20 and reduction of the processing load on the management control device 12.

It is to be noted that in the present embodiment, the timer value modifier 26 increments the time value from the minimum value to the maximum value by the constant $\alpha$. However, the present invention is not limited to the above configuration. It is further possible that the timer value is incremented by the constant $\alpha$ from the minimum value for a predetermined number of times (e.g., five times), and after the round of increment is completed, the timer value is allowed to be restored to the maximum value. As an alternative example, after accessing the management control device 12 for a predetermined number of times (e.g., five times) while keeping the timer value to be a minimum value, the timer value modifier 26 may modify the timer value to the maximum value.

The second embodiment of the present invention has been explained in the descriptions above.

Next, a third embodiment of the present invention will be explained. In the first embodiment, the timer value is modified to the minimum value when an event occurs, irrespective of significance of the event. In the present embodiment, a degree of reducing the timer value is changed according to the significance of the event.

Figures 13, 14:
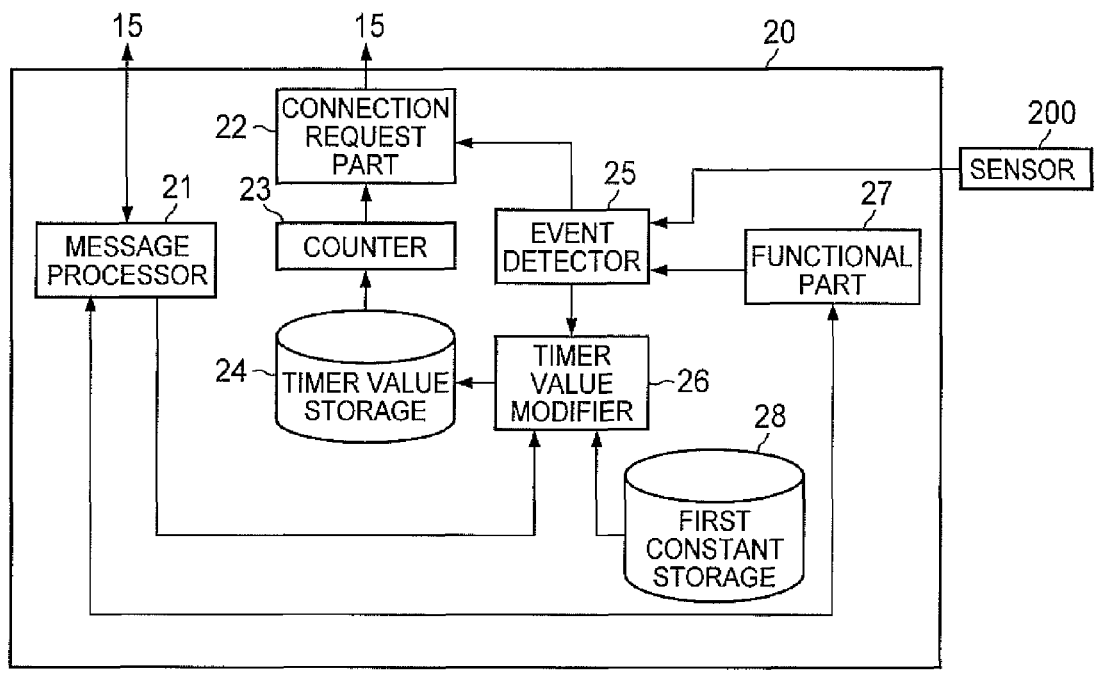
FIG. 13 is a block diagram showing a configuration example of the element terminal according to a third embodiment.
FIG. 14 illustrates one example of a data structure stored in the first constant storage.

FIG. 13 is a block diagram showing a configuration example of the element terminal 20 according to the third embodiment. The element terminal 20 has a message processor 21, a connection request part 22, a counter 23, a timer value storage 24, an event detector 25, a timer value modifier 26, a functional part 27, and a first constant storage 28. It is to be noted that except the point described below, the configurations in FIG. 13, labeled the same as those in FIG. 2, have the same or similar functions, and therefore they will not be explained tediously.

As shown in FIG. 14, for example, the first constant storage 28 stores in advance, a first constant 281 that is associated with significance 280, a value of which is subtracted from the timer value when an event with the significance 280 occurs, and an event ID 282 of the event corresponding to the significance 280.

An event being highly significant may be the case that, for example, the element terminal 20 provided with no redundant configuration has a breakdown, and the event has an impact on the user immediately. An event being moderately significant may be the case that, for example, one of the element terminals 20 which are redundantly configured has a breakdown, and the event has an impact on the user, if it is left unaddressed. An event being low significant may be the case that, for example, a cover of the enclosure of the element terminal 20 is open, or the like, and the event does not have a direct impact on the user.

As the constant A, which is associated with an event with high significance, a difference between the maximum value and the minimum value is set. As the constant B, which is associated with an event with moderate significance, a value smaller than the constant A is set. As the constant C, which is associated with an event with low significance, a value smaller than the constant B is set.

When an event occurs, the event detector 25 notifies the connection request part 22 and the timer value modifier 26, of the event ID of the event having occurred. Upon notified of the event ID by the event detector 25, the timer value modifier 26 refers to the first constant storage 28, and extracts the first constant associated with the event ID that is notified from the event detector 25.

Then, the timer value modifier 26 reads a timer value from the timer value storage 24, and subtracts the extracted first constant from the timer value being read. If the timer value from which the first constant has been subtracted is not below the minimum value, the timer value modifier 26 updates the timer value in the timer value storage 24 to the timer value from which the first constant has been subtracted, whereas if it is below the minimum value, the timer value modifier updates the timer value to the minimum value.

Figure 15:
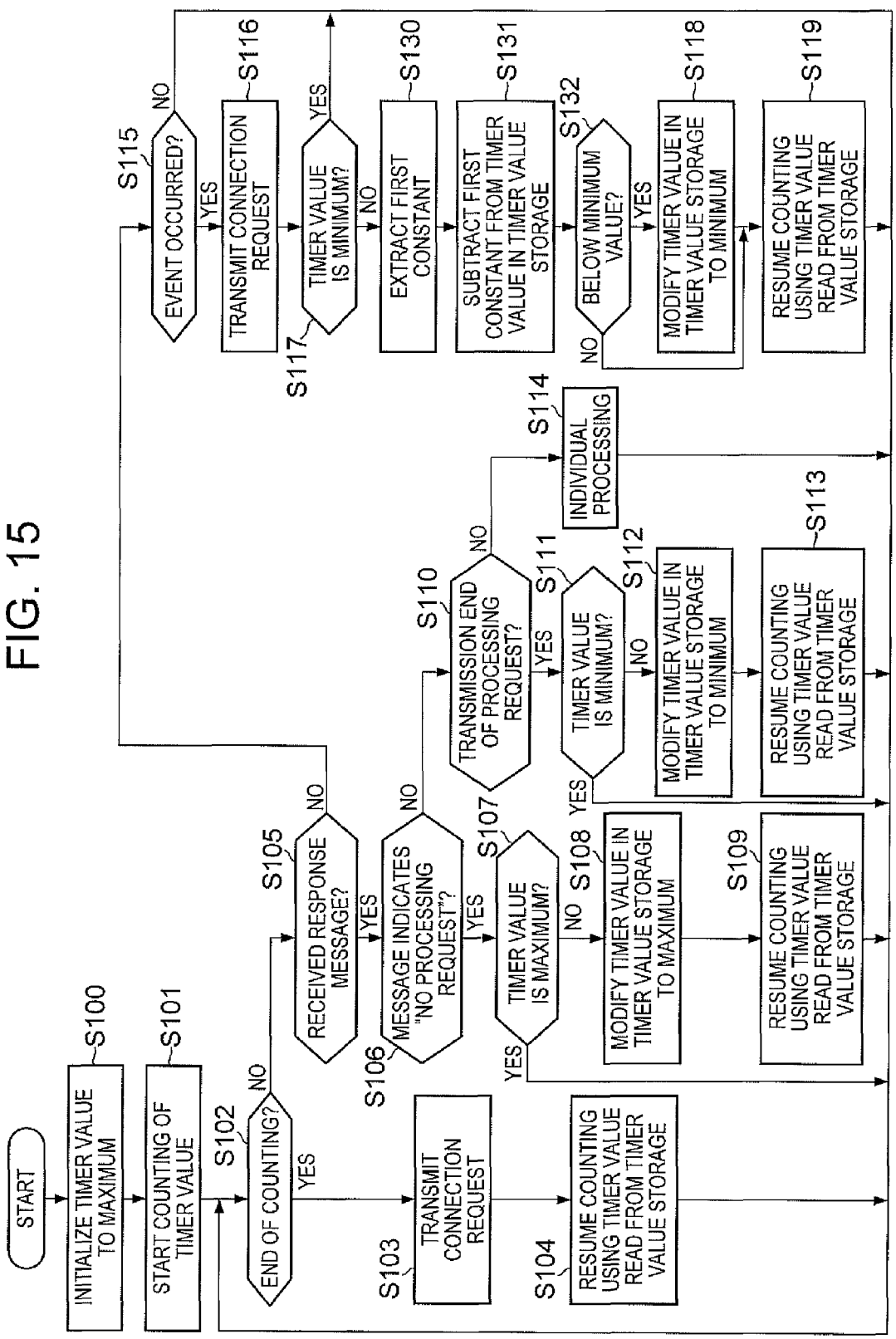
FIG. 15 is a flowchart showing an operation example of the element terminal according to the third embodiment.

FIG. 15 is a flowchart showing an operation example of the element terminal 20 according to the third embodiment. It is to be noted that except the point described below, the processes in FIG. 15 labeled the same as those in FIG. 7 are similarly performed, and therefore they will not be explained tediously.

In the step S115, when an event occurs (S115: Yes), the event detector 25 reports the event ID to the connection request part 22 and the timer value modifier 26. The connection request part 22 generates a connection request which has been explained with reference to FIG. 4. On this occasion, an ID associated with the description of the event which has occurred is stored in the field of the event ID of the connection request. The connection request part 22 transmits the connection request thus generated to the management control device 12 via the access control device 14 (S116).

Next, the timer value modifier 26 reads the timer value in the timer value storage 24, and determines whether or not the timer value in the timer value storage 24 is already the minimum value (S117). When the timer value in the timer value storage 24 is the minimum value (S117: Yes), the counter 23 executes again the process as shown in the step S102.

On the other hand, if the timer value in the timer value storage 24 is not the minimum value (S117: No), the timer value modifier 26 refers to the first constant storage 28 based on the event ID notified by the event detector 25, and extracts the first constant which is associated with the event ID notified by the event detector 25 (S130). Then, the timer value modifier 26 subtracts the first constant extracted in the step S130 from the timer value read in the step S117 (S131).

Next, the timer value modifier 26 determines whether or not the timer value from which the first constant has been subtracted is below the minimum value (S132). If the timer value from which the first constant has been subtracted is below the minimum value (S132: Yes), the timer value modifier 26 executes the process as shown in the step S118. On the other hand, if the timer value from which the first constant has been subtracted is not below the minimum value (S132: No), the timer value modifier 26 updates the timer value in the time value storage 24 to the timer value from which the first constant has been subtracted, and the counter 23 executes the process as shown in the step S119.

As thus described, when the significance of the event that has occurred is high, the timer value is modified to a smaller value, thereby allowing the accessing cycle of the element terminal 20 to be shortened for the event with the high significance, and enabling more immediate handling of the event.

The third embodiment of the present invention has been explained in the descriptions above.

Next, a fourth embodiment of the present invention will be explained. In the first embodiment, every time when an event occurs, the timer value is modified to the minimum value, irrespective of the significance of the event. The present embodiment considers the significance of the event, and when an event with high significance occurs, the timer value is immediately modified to the minimum value, and when an event with low significance occurs, the timer value is not modified to the minimum value until the event occurs for a predetermined number of times or more.

Figures 16, 17:
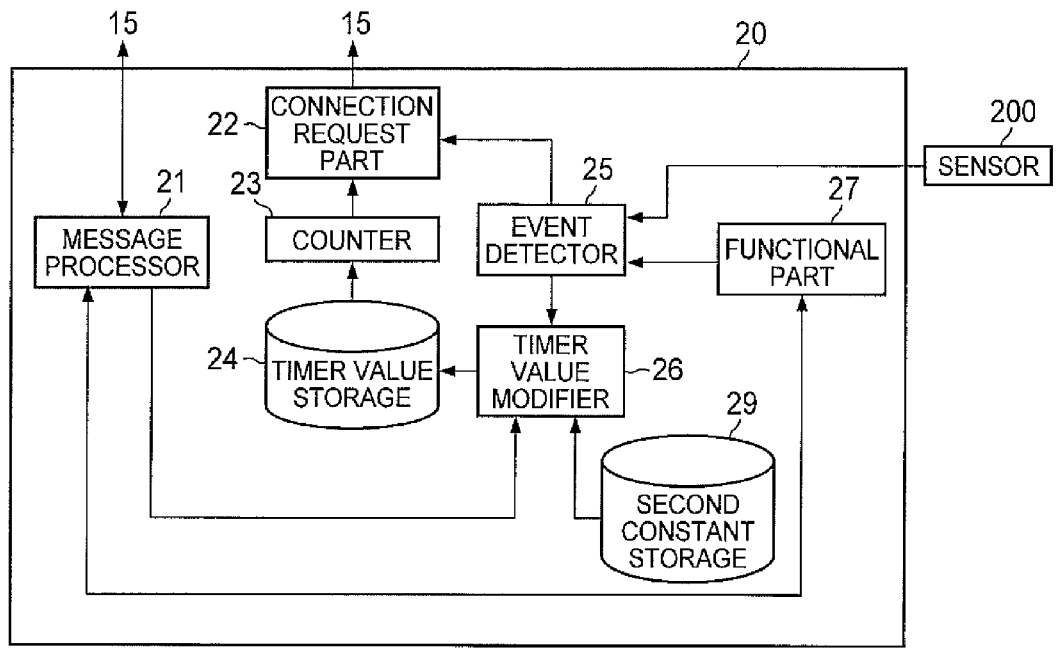
FIG. 16 is a block diagram showing a configuration example of the element terminal according to a fourth embodiment.
FIG. 17 illustrates an example of a data structure stored in the second constant storage.

FIG. 16 is a block diagram showing a configuration example of the element terminal 20 according to the fourth embodiment. The element terminal 20 has a message processor 21, a connection request part 22, a counter 23, a timer value storage 24, an event detector 25, a timer value modifier 26, a functional part 27, and a second constant storage 29. It is to be noted that except the point described below, the configurations in FIG. 16 labeled the same as those in FIG. 2 have the same or similar functions, and therefore they will not be explained tediously.

As shown in FIG. 17, for example, the second constant storage 29 stores in advance, a second constant 291 which is assigned to an event of significance 290, the second constant being associated with the significance, and an event ID 292 of the event corresponding to the significance 290.

As the constant a, which is associated with an event with high significance, for example 3, is set. As the constant b, which is associated with an event with moderate significance, a value smaller than the constant a (for example, 2) is set. As the constant c, which is associated with an event with low significance, a value smaller than the constant b (for example, 1) is set.

When an event occurs, the event detector 25 notifies the connection request part 22 and the timer value modifier 26 of the event ID of the event that has occurred. Upon notified of the event ID by the event detector 25, the timer value modifier 26 refers to the second constant storage 29, and extracts the second constant which is associated with the event ID that is notified by the event detector 25.

The timer value modifier 26 holds an accumulation value in advance, which stores zero as an initial value, and adds the second constant being extracted to the accumulation value. Then, when the accumulation value to which the second constant has been added becomes equal to or larger than a predetermined threshold, the timer value modifier 26 resets the accumulation value to zero, and changes the timer value in the timer value storage 24 to a minimum value. In the present embodiment, it is preferable that the predetermined threshold is a value equal to or less than the second constant that is associated with the event with the highest significance, so that the accumulation value always becomes equal to or larger than the threshold, when an event with the highest significance occurs.

Figure 18:
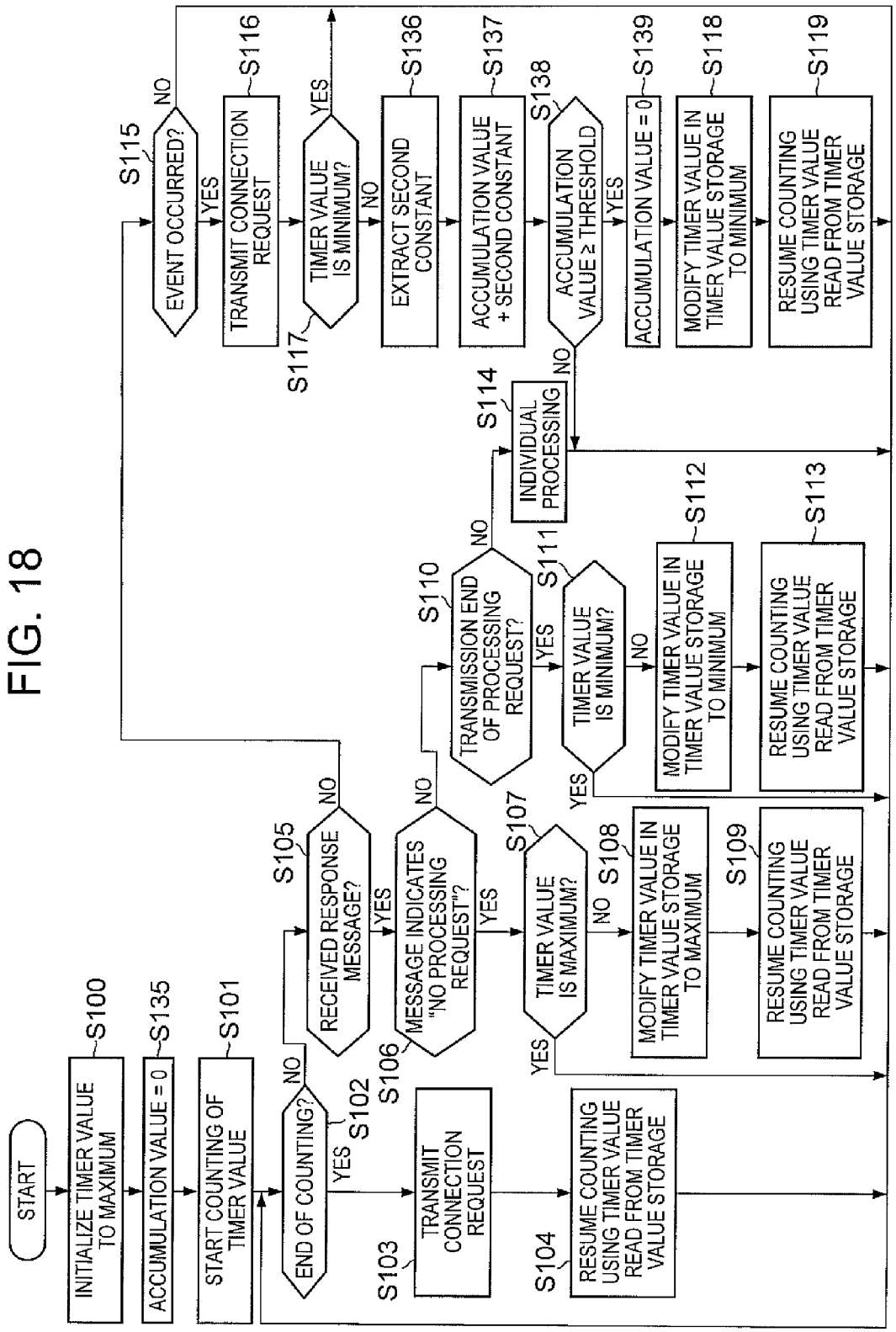
FIG. 18 is a flowchart showing an operation example of the element terminal according to the fourth embodiment.

FIG. 18 is a flowchart showing an operation example of the element terminal 20 according to the fourth embodiment. It is to be noted that except the point described below, the processes in FIG. 18 labeled the same as those in FIG. 7 are similarly performed, and therefore they will not be explained tediously.

Firstly, the timer value modifier 26 initializes the timer value in the timer value storage 24 to the maximum value (S100), and initializes the accumulation value to zero (S135).

In the step S115, when an event occurs (S115: Yes), the event detector 25 notifies the connection request part 22 and the timer value modifier 26 of the event ID. The connection request part 22 generates a connection request which has been explained with reference to FIG. 4, and transmits the connection request thus requested to the management control device 12 via the access control device 14 (S116).

Next, the timer value modifier 26 reads the timer value in the timer value storage 24, and determines whether or not the timer value in the timer value storage 24 is already the minimum value (S117). If the timer value in the timer value storage 24 is already the minimum value (S117: Yes), the counter 23 executes again the process as shown in the step S102.

On the other hand, if the timer value in the timer value storage 24 is not the minimum value (S117: No), timer value modifier 26 refers to the second constant storage 29 based on the event ID notified by the event detector 25, and extracts the second constant associated with the event ID notified by the event detector 25 (S136). Then, the timer value modifier 26 adds the extracted second constant to the accumulation value (S137).

Next, the timer value modifier 26 determines whether or not the accumulation value to which the second constant has been added becomes equal to or larger than a threshold (S138). When the accumulation value to which the second constant has been added becomes equal to or larger than the threshold (S138: Yes), the timer value modifier 26 resets the accumulation value to zero (S139) and executes the processing as shown in the step S118. On the other hand, when the accumulation value to which the second constant has been added is less than the threshold (S138: No), the counter 23 executes again the process as shown in the step S102.

As thus described, as for the event with high significance, the timer value is modified to the minimum value every time when the event occurs, but as for the event with low significance, the timer value is not modified to the minimum value until the accumulation point exceeds the threshold, even though any event occurs. With this configuration, it is possible to restrict the number of the events which shorten the cycle for accessing the management control device 12, thereby holding down the load growth on the managing control device.

The fourth embodiment of the present invention has been explained in the descriptions above.

Figure 19:
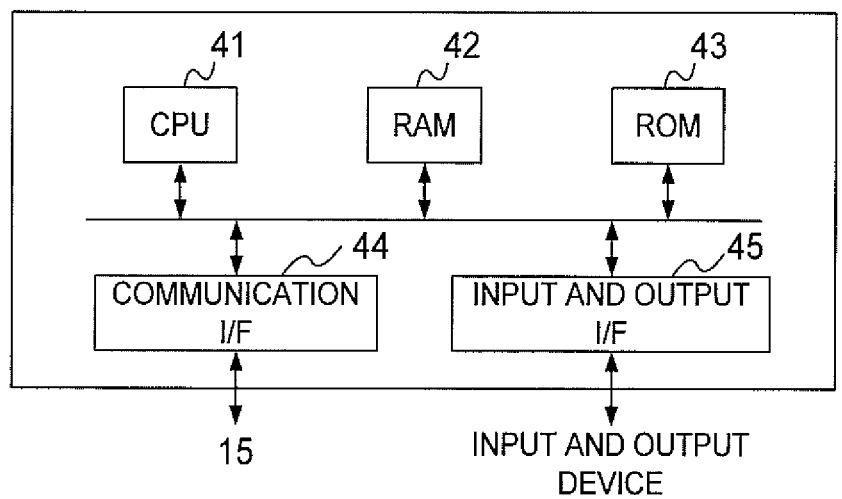
FIG. 19 is a hardware configuration diagram showing a hardware configuration example of a computer which implements functions of the element terminal.

The element terminal 20 in the first, the second, the third, or the fourth embodiment may be implemented by a computer 40 having the configuration as shown in FIG. 19, for instance. FIG. 19 is a hardware block diagram showing an example of hardware configuration of the computer 40 which implements the functions of the element terminal 20. The computer 40 has a CPU (Central Processing Unit) 41, RAM (Random Access Memory) 42, ROM (Read Only Memory) 43, a communication interface (I/F) 44, and an I/O interface (I/F) 45.

The CPU 41 operates based on the programs stored in the ROM 43, and controls over each part. The ROM 43 stores programs, data, and the like. The communication interface 44 receives data from other equipment via the communication line 15 and transmits the data to the CPU 41, and also transmits the data generated by the CPU 41 to other equipment via the communication line 15.

The CPU 41 controls via the I/O interface 45, an output device such as a display and a speaker, and an input device such as a key pad. The CPU 41 acquires data from the input device via the I/O interface 45, and outputs the generated data to the output device via the I/O interface 45.

When the computer 40 functions as the element terminal 20 identified in the first and the second embodiments, the CPU 41 of the computer 40 executes the programs loaded on the RAM 42, thereby implementing each of the functions of the message processor 21, the connection request part 22, the counter 23, the event detector 25, the timer value modifier 26, and the functional part 27. The RAM 42 further stores data in the timer value storage 24.

In addition, when the computer 40 functions as the element terminal 20 identified in the third embodiment, the data in the first constant storage 28 is further stored in the ROM 43. In the case where the computer 40 functions as the element terminal 20 identified in the fourth embodiment, the data in the second constant storage 29 is further stored in the ROM 43.

The CPU 41 in the computer 40 reads those programs from the ROM 43 and executes them. As an alternative example, it is possible to acquire these programs from other devices, via the communication line 15 and the access control device 14.

The present invention is not limited to each of the embodiments as described above, but including various examples. By way of example, each of the above embodiments described above is explained in detail for easily understanding the present invention. Therefore, the present invention is not necessarily limited to those provided with all the constitutional elements mentioned above. In addition, a part of one embodiment may be replaced by a configuration of other embodiment, or a configuration of one embodiment may be added to a configuration of other embodiment. A part of configuration of each of the embodiments may be subjected to addition of other configuration, deletion, or replacement by other configuration.

A part or all of the configurations, functions, processing parts, processing means, and the like, may be implemented by hardware, such as designing an integrated circuit, for instance. Alternatively, each of the configurations and functions described above may be implemented by software according to a processor which interprets and executes programs for implementing those functions. Information of the programs, tables, files and the like for implementing each of the functions may be stored in a recording device, such as a memory, a hard disk, and an SSD (Solid State Drive), or a recording medium such as an IC card, SD card, and DVD.

Control lines and information lines are illustrated as required for explanation, and all of the control lines and information lines in a product are not necessarily illustrated. In practice, it is conceivable that almost all the configurations are connected with one another.

What is claimed is:

1. An element terminal connected to a communication network, comprising;
   a computer including a central processing unit that executes programs loaded onto memory to implement functions of:
   a timer value storage for storing a timer value used for counting a cycle for transmitting a connection request to a management control device for managing the element terminal, via the communication network;
   a counter for reading the timer value in the timer value storage and counting the cycle indicated by the timer value;
   a connection request transmission part for transmitting the connection request to the management control device via the communication network, every time when the counter finishes counting the cycle indicated by the timer value;
   an event detector for detecting an event having occurred in the element terminal; and
   a timer value modifier for modifying the timer value in the timer value storage, to a value indicating a shorter cycle within a range limited to a minimum value which is predetermined, upon detecting the event by the event detector, wherein:
   the connection request transmission part further transmits the connection request to the management control device via the communication network, upon detecting the event by the event detector, and
   the timer value modifier modifies the timer value in the timer value storage to a value indicating a longer cycle within a range limited to a maximum value being predetermined, upon receiving a message indicating there is no processing request from the management control device, via the communication network.

2. The element terminal according to claim 1, wherein:
   the timer value modifier modifies the timer value in the timer value storage to a value indicating a shorter cycle within a range limited to a minimum value which is predetermined, upon receiving a message including a processing request from the management control device, via the communication network.

3. The element terminal according to either of claim 1 and claim 2, further comprising:
a first constant storage for storing a first constant indicating a value which becomes larger as a degree of significance of an event becomes higher, in association with an event ID for identifying each event occurring in the element terminal, wherein:
the timer value modifier extracts from the first constant storage, the first constant associated with the event ID of the event, upon detecting the event by the event detector, and stores in the timer value storage as a timer value after modification, a value obtained by subtracting the first constant being extracted from the timer value in the timer value storage.

4. The element terminal according to any one of claims 1 to 3, further comprising:
a second constant storage for storing a second constant indicating a value which becomes larger as a degree of significance of an event becomes higher, in association with the event ID for identifying each event occurring in the element terminal, wherein:
the timer value modifier extracts from the second constant storage, the second constant associated with the event ID of the event, upon detecting the event by the event detector, adds the second constant being extracted to an accumulation value of the second constant having been accumulated until the latest occurrence of the event, and modifies the timer value in the timer value storage to a value indicating a shorter cycle within a range limited to a predetermined minimum value, when the accumulation value after the addition becomes equal to a larger than a predetermined threshold.

5. The element terminal according to any one of claims 1 to 4, wherein:
the timer value modifier restores the timer value in the timer value storage to a predetermined maximum value, upon receiving a message indicating that there is no processing request, from the management control device via the communication network.

6. The element terminal according to any one of claims 1 to 4, wherein:
the timer value modifier gradually modifies the timer value in the timer value storage, to a value indicating a longer cycle within a predetermined range limited to a maximum value, upon receiving a message indicating that there is no processing request, from the management control device via the communication network.

7. A communication system comprising:
a plurality of element terminals connected to a first communication network;
a management control device connected to a second communication network; and managing and controlling each of the plurality of element terminals, and
an access control device connected to the first communication network and the second communication network, wherein;
the access control device permits communication being started from the communication equipment connected to the first communication network, between the communication equipment connected to the first communication network and communication equipment connected to the second communication network, whereas the access control device prohibits the communication being started from the communication equipment connected to the second communication network, between the communication equipment connected to the first communication network and the communication equipment connected to the second communication network, and
the element terminal according to any one of claims 1 to 6 serves as each of the plurality of element terminals.

* * * * *